United States Patent
Zenz

(10) Patent No.: US 8,669,123 B2
(45) Date of Patent: Mar. 11, 2014

(54) METHOD OF AND DEVICE FOR DETERMINING AND CONTROLLING THE DISTANCE BETWEEN AN INTEGRATED CIRCUIT AND A SUBSTRATE

(75) Inventor: Christian Zenz, Graz (AT)

(73) Assignee: NXP B.V., Eindhoven (NL)

( * ) Notice: Subject to any disclaimer, the term of this patent is extended or adjusted under 35 U.S.C. 154(b) by 741 days.

(21) Appl. No.: 12/745,465

(22) PCT Filed: Nov. 25, 2008

(86) PCT No.: PCT/IB2008/054944
§ 371 (c)(1),
(2), (4) Date: May 28, 2010

(87) PCT Pub. No.: WO2009/069075
PCT Pub. Date: Jun. 4, 2009

(65) Prior Publication Data
US 2010/0323459 A1 Dec. 23, 2010

(30) Foreign Application Priority Data

Nov. 29, 2007 (EP) .................................... 07121879
Dec. 11, 2007 (EP) .................................... 07122903

(51) Int. Cl.
*H01L 21/00* (2006.01)
*G01B 11/06* (2006.01)

(52) U.S. Cl.
USPC .................. 438/7; 257/E21.253; 356/631

(58) Field of Classification Search
USPC ...................... 438/7; 257/E21.253
See application file for complete search history.

(56) References Cited

U.S. PATENT DOCUMENTS

| 4,666,309 | A | * | 5/1987 | Barry et al. | 356/446 |
| 4,708,483 | A | | 11/1987 | Lorenz | |
| 4,999,509 | A | * | 3/1991 | Wada et al. | 250/559.27 |
| 6,829,056 | B1 | * | 12/2004 | Barnes et al. | 356/625 |
| 2002/0001862 | A1 | | 1/2002 | Ushio et al. | |
| 2003/0011789 | A1 | | 1/2003 | Shirley | |
| 2003/0138186 | A1 | * | 7/2003 | Kaneshiro et al. | 385/14 |
| 2004/0066499 | A1 | | 4/2004 | Rheme et al. | |
| 2005/0105103 | A1 | * | 5/2005 | Schietinger et al. | 356/630 |
| 2006/0108919 | A1 | * | 5/2006 | Kobayashi | 313/506 |
| 2006/0109630 | A1 | * | 5/2006 | Colgan et al. | 361/718 |
| 2006/0214680 | A1 | * | 9/2006 | Majhi | 324/766 |
| 2008/0152879 | A1 | * | 6/2008 | Nashiki et al. | 428/212 |

FOREIGN PATENT DOCUMENTS

| EP | 0660075 A2 | 6/1995 |
| JP | 07 254603 A | 10/1995 |
| JP | 10 075096 A | 3/1998 |
| JP | 11 183406 A | 7/1999 |

* cited by examiner

Primary Examiner — Matthew Landau
Assistant Examiner — Igwe U Anya

(57) ABSTRACT

In a method of determining the distance (d) between an integrated circuit (1) and a substrate (2) emitted light enters the at least semi transparent substrate (2), passes through the substrate (2) and an at least semi transparent material (8), is reflected by the integrated circuit (1), passes again through the material (8) and the substrate (2), and leaves the substrate (2). The at least semi transparent material (8), particularly is an at least semi transparent adhesive, provided between the substrate (2) and the integrated circuit (1). The distance (d) between the substrate (2) and the integrated circuit (1) is determined by evaluating the intensities of the light leaving and entering the substrate (2), particularly by evaluating the ratio between the intensities of the light leaving and entering the substrate (2).

11 Claims, 4 Drawing Sheets

METHOD OF AND DEVICE FOR DETERMINING AND CONTROLLING THE DISTANCE BETWEEN AN INTEGRATED CIRCUIT AND A SUBSTRATE

FIELD OF THE INVENTION

The invention relates to a method of and a device for determining the distance between an integrated circuit and a substrate. Furthermore, the invention relates to a method of and a device for controlling attaching an integrated circuit to a substrate.

BACKGROUND OF THE INVENTION

Flip chip technology for manufacturing electronic devices is well known in prior art. Here an integrated circuit, which is also referred to as a chip, is mounted on a substrate such that connecting bumps of the integrated circuit electrically contact contacts of the substrate. In order to accomplish contact between the bumps and the substrate contacts, the integrated circuit is pressed against the substrate and heated such that the bumps partly penetrate the substrate contacts and an adhesive between the substrate and the integrated circuit cures. The tool used for pressing the integrated circuit to the substrate and applying heat is usually referred to as a thermode.

Since the parameters of the mounting process, e.g. heat, pressure, the properties of the integrated circuits, the substrate, the adhesive, etc. vary, the distance between the substrate and the integrated circuit is relatively hard to control. Because several integrated circuits are normally mounted simultaneously on their substrates utilizing a plurality of thermodes, controlling said distance (for all integrated circuits) is even more problematic. Moreover, usually a thin layer of paper for avoiding contamination of the thermodes by the adhesive is fed between the thermodes and the integrated circuits. Unfortunately, this paper also influences the manufacturing process in a way, which is hard to predict.

OBJECT AND SUMMARY OF THE INVENTION

It is an object of the present invention to provide a method to determine the distance between an integrated circuit and a substrate.

A further object of the invention is to provide a device for determining the distance between an integrated circuit and a substrate.

The object is achieved in accordance with the invention by means of a method of determining the distance between an integrated circuit and a substrate, comprising the steps of:

emitting light that enters an at least semi transparent substrate, passes through the substrate and an at least semi transparent material, particularly an at least semi transparent adhesive, provided between the substrate and an integrated circuit, is reflected by the integrated circuit, passes again through the material and the substrate, and leaves the substrate; and determining the distance between the substrate and the integrated circuit by evaluating the intensities of the light leaving and entering the substrate, particularly by evaluating the ratio between the intensities of the light leaving and entering the substrate.

The object is also achieved in accordance with the invention by means of a device for determining the distance between an integrated circuit and a substrate, comprising a light source configured to emit light such that the light of the light source enters an at least semi transparent substrate, passes through the substrate and an at least semi transparent material, particularly an at least semi transparent adhesive, that is located between the substrate and an integrated circuit, is reflected by the integrated circuit, passes again through the material and the substrate, and leaves the substrate; and a measuring device configured to measure the intensity of the light leaving the substrate; wherein the device is configured to determine the distance between the substrate and the integrated circuit by evaluating the measured intensity of the light leaving and the intensity of the light entering the substrate, particularly by evaluating the ratio between the measured intensity of the light leaving and the intensity of the light entering the substrate.

The inventive device for determining the distance between an integrated circuit and a substrate can be used to perform the inventive method. The inventive device and the inventive method, respectively, are provided for measuring the distance between the integrated circuit, which is or is currently being attached to the at least semi transparent substrate which may, for instance, be a relatively thin plastic foil. The purpose of attaching the integrated circuit to the substrate is, for instance, to connect contacts of the integrated circuit, such as bumps, to electric contacts of the substrate. The material between the integrated circuit and the substrate is also at least semi transparent and may particularly be an adhesive configured to attach the integrated circuit to the substrate. In order to measure the distance between the substrate and the integrated circuit, light is fed to the substrate, particularly to the substrate surface opposite to the substrate surface the integrated circuit is or is being attached to. The light fed to the substrate is partly absorbed by the substrate and particularly by the material, is then at least partly reflected by the integrated circuit, particularly by a circuit surface facing the substrate, and again partly absorbed by the material and the substrate before leaving the substrate. As a result, the intensity of the light entering the substrate is greater than the intensity of the light leaving the substrate.

The so-called Lambert law may describe the absorption of light due to an optical layer:

$$I = I_0 e^{-\alpha d}$$

wherein $I_0$ is the intensity of light entering the optical layer, I is the intensity of light leaving the optical layer, d is the thickness of the optical layer, and $\alpha$ is the absorption coefficient describing the amount of light the optical layer is absorbing. Thus, if the absorption coefficient of the optical layer, i.e. the physical properties of the at least semi transparent material and the substrate are known, the distance between the integrated circuit and the substrate can at least theoretically be determined according to the Lambert law. Since in practice, scattering of light, absorption of light by the integrated circuit, etc., may occur, the relationship between the distance and the intensity of light leaving the substrate may have to be determined empirically a priori.

The determined distance may be used for controlling a process of connecting the integrated circuit to the substrate in response to the determined distance, particularly such that the distance between the integrated circuit and the substrate has a pre-determined distance at the end of the process. Then, the inventive device may comprise a control device for this controlling step. Therefore, it is possible to control the attachment process of the integrated circuit to the substrate in a relatively simple manner such that at the end of the attachment process the integrated circuit has the pre-determined distance to the substrate. Then, a parasitic capacitance dependent on the distance between the substrate and the integrated circuit can be planned in advance and thus properties of the integrated circuit may be chosen accordingly. According to this embodiment, the attachment process is controlled, particularly by means of a feedback control structure whose control variable is the determined distance, in response to the determined distance. This, however, is not absolutely necessary. The attachment process can also be controlled in response to the intensity of the light leaving the substrate.

Then, in a further aspect of the invention, a method for controlling attaching an integrated circuit to a substrate, comprises the steps of:

placing an integrated circuit on a surface of an at least semi transparent substrate, wherein an at least semi transparent material, particularly an at least semi transparent adhesive, is provided between the integrated circuit and the surface of the substrate;

emitting light that enters the substrate, passes through the substrate and the material, is reflected by the integrated circuit, passes again through the material and the substrate, and leaves the substrate;

evaluating the intensity of the light leaving the substrate; and controlling, in response to the evaluated intensity of the light leaving the substrate, the process of attaching the integrated circuit to the substrate, particularly controlling a force and/or a pressure the integrated circuit is pressed on the surface of the substrate, a feed the integrated circuit is moved towards the surface of the substrate, and/or a temperature that is applied to the material during the process of attaching the integrated circuit to the substrate.

A corresponding device for controlling attaching an integrated circuit to a substrate, comprises a light source configured to emit light such that the light of the light source enters an at least semi transparent substrate, passes through the substrate and an at least semi transparent material, particularly an at least semi transparent adhesive, that is located between the substrate and an integrated circuit, is reflected by the integrated circuit, passes again through the material and the substrate, and leaves the substrate;

a measuring device configured to measure the intensity of the light leaving the substrate; and a control device configured to control, in response to the measured intensity of the light leaving the substrate, a process of attaching the integrated circuit to the substrate, particularly by controlling a force and/or a pressure the integrated circuit is pressed on the surface of the substrate, a feed the integrated circuit is moved towards the surface of the substrate, and/or a temperature that is applied to the material during the process of attaching the integrated circuit to the substrate.

These embodiments thus offer the advantage of controlling the process of attaching the integrated circuit to the substrate in a relatively simple manner.

When controlling the process of attaching the integrated circuit to the substrate, the intensities of the light leaving and entering the substrate, particularly the ratio of the intensities of the light leaving and entering the substrate, may be evaluated in order to control the process of attaching the integrated circuit to the substrate in response to the evaluated intensities, particularly in response to the ratio of the intensities.

The inventive methods and the inventive devices, respectively, are particularly used such that the integrated circuit has a pre-determined distance to the substrate. This may be achieved by increasing the force, the pressure and/or the feed until the intensity of the light leaving the substrate, and particularly until the ratio of the intensities of the light leaving and entering the substrate reaches a predefined value. For the process of attaching the integrated circuit to the substrate, a so-called thermode may be used. A thermode is a device, which presses the integrated circuit to the substrate and applies heat for curing the material (which is particularly an adhesive). Thus, the force, pressure and/or feed of the thermode may be increased until the pre-determined distance or intensity is reached. Alternatively or additionally, the temperature of the thermode may be controlled in response to the light intensity.

The optical properties of the material may be modified by, for instance, adding pigments in order to adjust the absorption of the material. The pigments may also or alternatively affect scattering of the light passing through the material. By modifying the optical properties of the material it is possible to adjust the ratio of the intensities of the light leaving and entering the substrate such that the wanted distance between the substrate and the integrated circuit corresponds particularly to a ratio between 0.3 and 0.7, preferable between 0.4 and 0.6, and particularly 0.5.

The inventive device may be calibrated such that the measurement range of the measuring device corresponds to 100% if the integrated circuit touches the substrate.

If the substrate is transparent, a calibration of the inventive devices can be achieved utilizing a transparent reference substrate. The thickness of the substrate may be determined by pressing the reference substrate into a soft material, for instance, a resin, and by measuring the imprint of the resin. It is also possible to apply a special layer on the surface of the integrated circuit facing the substrate. This special layer may particularly be designed to reflect the light relatively well.

It is also possible to apply an auxiliary layer, particularly a transparent auxiliary layer, to the integrated circuit. The auxiliary layer may be applied to the entire integrated circuit or only partially. The auxiliary layer may help to reliably detect even a relative small distance between the integrated circuit and the substrate. The auxiliary layer may have mechanical advantages, because potentially more material remains between the substrate and the integrated circuit, potentially improving attachment of the integrated circuit to the substrate.

The light may be guided to the substrate by means of a first light guide configured to guide the light of the light source to the substrate, and a second light guide may guide the light leaving the substrate to the measuring device. The light guides may particularly be incorporated in the thermode, particularly in a base plate of the thermode.

BRIEF DESCRIPTION OF THE DRAWINGS

The invention will be described in greater detail hereinafter, by way of non-limiting examples, with reference to the embodiments shown in the drawings.

DESCRIPTION OF EMBODIMENTS

Figure 1:
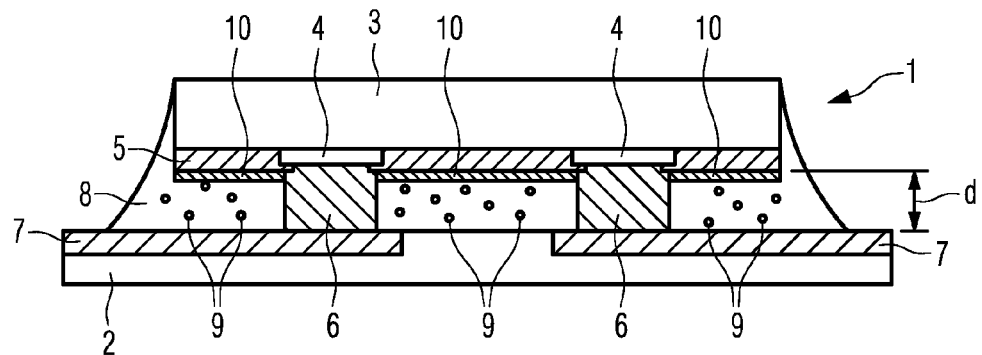
FIG. 1 is an integrated circuit attached to a substrate.

FIG. 1 shows an integrated circuit 1 attached to a substrate 2. The integrated circuit 1 may, for instance, be an integrated circuit for an RFID transponder and the substrate 2 may be a strap, via which contacts of the integrated circuits 1 are connected to an antenna of the RFID transponder.

According to the exemplary embodiment, the integrated circuit 1 comprises a main body 3 that includes the circuitry of the integrated circuit 1, connection pads 4, a passivation layer 5, and bumps 6. The substrate 2 comprises a metallization structure 7 applied on a first surface of the substrate 2. The metallization structure 7 may be made from aluminum and form contacts, for instance, to connect the bumps 6 to the antenna.

The passivation layer 5 is a sealing layer to prevent the circuitry from deterioration of the electric properties through chemical reaction, corrosion, or handling during a packaging process. The material of the passivation layer 5 is silicon dioxide according to the exemplary embodiment and forms a surface of the integrated circuit 1. The connection pads 4 may be made from aluminum and are accessible through holes in the passivation layer 5. The connection pads 4 are in electrical contact with the bumps 6 and the circuitry of the integrated circuit 1. The bumps 6 may be made from gold and are provided to be connected to the metallization structure 7.

In order to attach the integrated circuit 1 with its passivation layer 5 facing the substrate 2, an adhesive 8 is located between the integrated circuit 1 and the substrate 2. Suitable adhesives 8 are, for instance, non-conductive pastes (NCP) or anisotropic conductive pastes (ACP) particularly comprising small conductive particles. Alternatively, adhesive materials such as non-conductive adhesive (NCA), non-conductive foil (NCF) or anisotropic conductive adhesive (ACA) or anisotropic conductive foil (ACF) can be used. If solder bumps are used for the contact, then instead of the adhesive 8 an at least semi transparent underfill material can be used.

Figure 2:
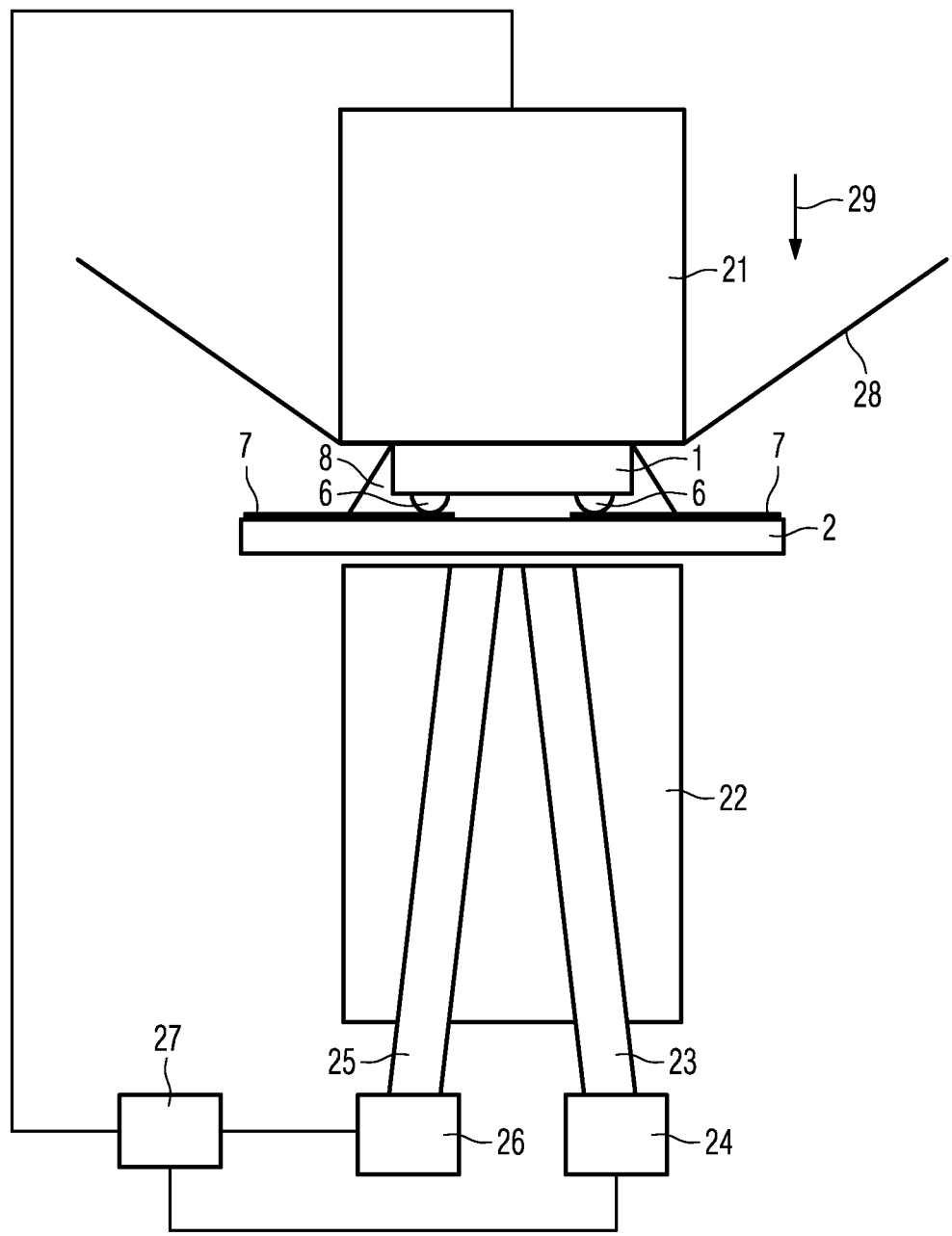
FIG. 2 illustrates the process of attaching the integrated circuit to the substrate.
Figure 3:
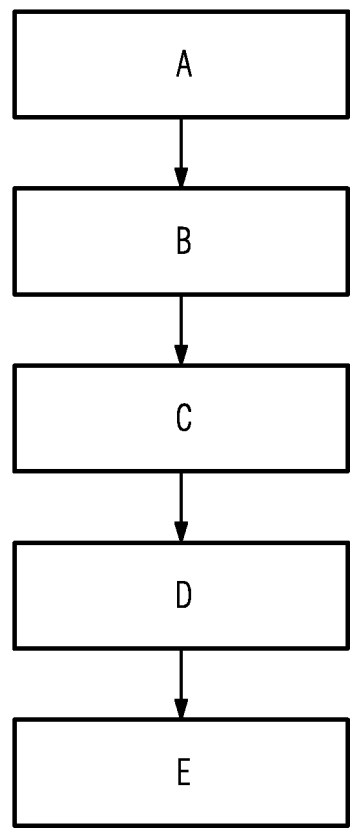
FIG. 3 is a flow chart illustrating the process of attaching the integrated circuit to the substrate.

According to the exemplary embodiment, the integrated circuit 1 is attached to the substrate 2 by means of a thermode 21 as depicted in FIG. 2. FIG. 3 illustrates the method of attaching the integrated circuit 1 to the substrate 2.

First, the substrate 2 is placed on a base plate 22 with its surface vis-à-vis the metallization structure 7 (step A in FIG. 3). On the surface comprising the metallization structure 7 vis-à-vis the base plate 22 the integrated circuit 1 and the adhesive 8 is located.

According to the exemplary embodiment, the base plate 22 comprises a first light guide 23 connected to a light source 24 and a second light guide 25 connected to a measuring device 26 configured to measure the intensity of light. The first light guide 23 is arranged within the base plate 22 such that it guides light emitted from the light source 24 to the surface of the base plate 22, on which the substrate 2 is placed. The first light guide 23 is particularly arranged such that the light emitted from the light source 24 can enter the substrate 2, pass through the substrate 2 and the adhesive 8, can be reflected at least partly by the passivation layer 5 of the integrated circuit 1, pass through the adhesive 8 and the substrate 2 again, and finally can leave the substrate 2 (step B in FIG. 3). In order that the light can pass through the substrate 2, the substrate 2 is at least semi transparent. According to the exemplary embodiment, the substrate 2 is a relatively thin plastic foil made, for instance, from Polyethyleneterephthalate (PET).

According to the exemplary embodiment, the second light guide 25 is arranged such that it guides the light leaving the substrate 2 to the measuring device 26. Thus, the measuring device 26 measures the intensity of the light leaving the substrate 2.

The measuring device 26 is connected to a control device 27, which processes the measured intensity of the light leaving the substrate 2 (step C in FIG. 3). The control device 27 is connected and configured to control the thermode 21 in response to the measured intensity of the light leaving the substrate 2 (step D in FIG. 3).

It should be noted that the inventive device may comprise a second measuring device (not shown in FIGS.), which measures the intensity of the light leaving the light source 24 or entering the substrate 2 respectively. Thus, the second measuring device would be arranged between the light source 24 and the substrate 2. For example the light emitted by the light source 24 can be split into two beams by means of a prism or a semitransparent mirror. One part is forwarded to the substrate 2, the other one is lead to the second measuring device. The advantage of such an arrangement is that two identical light sensors can be used for measuring the intensity of the light entering and leaving the substrate 2 why a comparison of both intensities or a calculation of a ratio of both intensities involves a reduced measuring error.

The thermode 21 comprises a surface that may be a diamond surface, which contacts the integrated circuit 1 via a sheet of paper 28, which paper 28 shall avoid contamination of the thermode 21. In order to bond the integrated circuit 1 to the substrate 2, the thermode 21 presses the integrated circuit 1 toward the substrate 2 (in the direction of the arrow 29). Due to the pressure or force applied to the integrated circuit 1 by the thermode 21, the adhesive 8 which has not been cured yet, is, inter alia, compressed such that the distance d between the integrated circuit 1 and the substrate 2 is decreased.

The substrate 2 and the adhesive 8 are at least semi transparent and absorb the light emitted from the light source 24 and guided to the substrate 2 by the first light guide 23. As a result, the intensity of the light leaving the substrate 2 and guided to the measuring device 26 via the second light guide 25 is less then the intensity of the light emitted by the light source 24.

Figure 4:
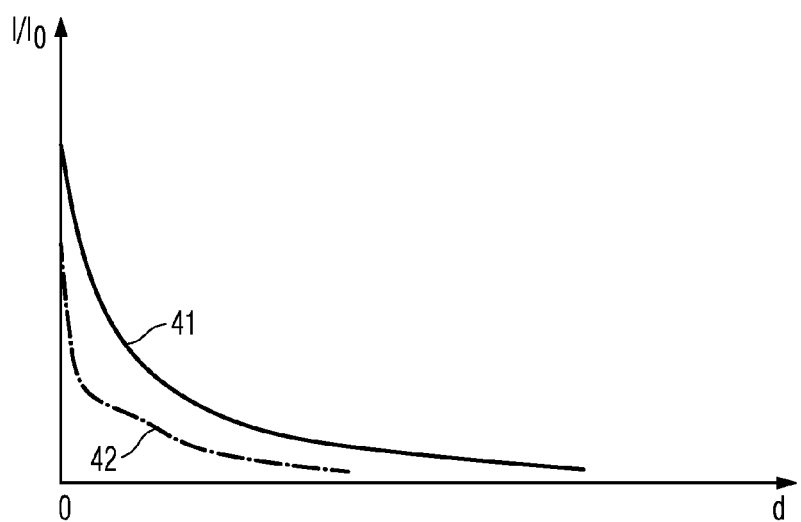
FIG. 4 is a diagram illustrating the relationship between light intensity and distance between the substrate and the integrated circuit.

The so-called Lambert law can describe the absorption of light due to an optical layer:

$$I = I_0 e^{-\alpha d}$$

wherein $I_0$ is the intensity of light entering the optical layer, I is the intensity of light leaving the optical layer, d is the thickness of the optical layer, and $\alpha$ is the absorption coefficient describing the amount of light the optical layer is absorbing. This theoretical relationship is illustrated by a graph 41 shown in FIG. 4. In practice, however, scattering of light, absorption of light by the integrated circuit 1, etc., may occur. Then, the relationship between the distance d and the intensity I of light leaving the substrate 2 may have to be determined empirically a priori (see example illustrated by a graph 42 in FIG. 4).

According to the exemplary embodiment, the thermode 21 is controlled by the control device 27 such that it exerts pressure or force to the integrated circuit 1 until the intensity I of the light leaving the substrate 2 reaches a pre-defined value (desired intensity $I_{desired}$), see step E in FIG. 3. The desired intensity $I_{desired}$ corresponds to a pre-defined distance $d_{desired}$ at which the integrated circuit 1 shall be placed apart from the substrate 2. When the intensity I of the light leaving the substrate 2 reaches the desired intensity $I_{desired}$, then the control device 27 stops the thermode 21 and causes the thermode to apply heat to the integrated circuit 1, in order to cure the adhesive 8.

Alternatively, the control device 27 may be configured to control the thermode 21 in response to the intensities of the light leaving and entering the substrate 2, particularly the ratio of the intensities of the light leaving and entering the substrate 2. Then, the control device 27 may also be connected to the light source 24.

Particularly, when the control device 27 utilizes the ratio between the intensities of the light leaving and entering the substrate 2 for controlling the pressure, force and/or feed of the thermode 21, the optical properties of the adhesive 8 can be chosen such that the ratio of the desired intensity $I_{desired}$ to the intensity of the light entering the substrate 2 is within 0.4 and 0.6, and particularly is 0.5. This can be achieved, for instance, by adding pigments 9 to the adhesive 8. The pigments 9 may absorb and/or scatter the light passing through the adhesive 8.

The integrated circuit 1 may entirely or partly be covered with a transparent auxiliary layer 10. The auxiliary layer 10 may help to reliably detect even a relative small distance d between the integrated circuit 1 and the substrate 2. The auxiliary layer 10 may also have mechanical advantages, because potentially less adhesive 8 remains between the substrate 2 and the integrated circuit 1, potentially improving the joint between the integrated circuit 1 and the substrate 2.

Alternatively, the control device 27 can be configured to first determine the distance d between the substrate 2 and the integrated circuit 1 by evaluating the intensity I of the light leaving the substrate, by evaluating the intensities $I_0$, I of the lights entering and leaving the substrate 2 or by evaluating the ratio $I/I_0$ intensities I, $I_0$ of the lights leaving and entering substrate 2.

The method and device described hereinbefore are particularly useful when assembling RFID devices.

As mentioned above, the integrated circuit 1 may particularly be a circuit for an RFID transponder and the substrate 2 may be a strap.

Figure 5:
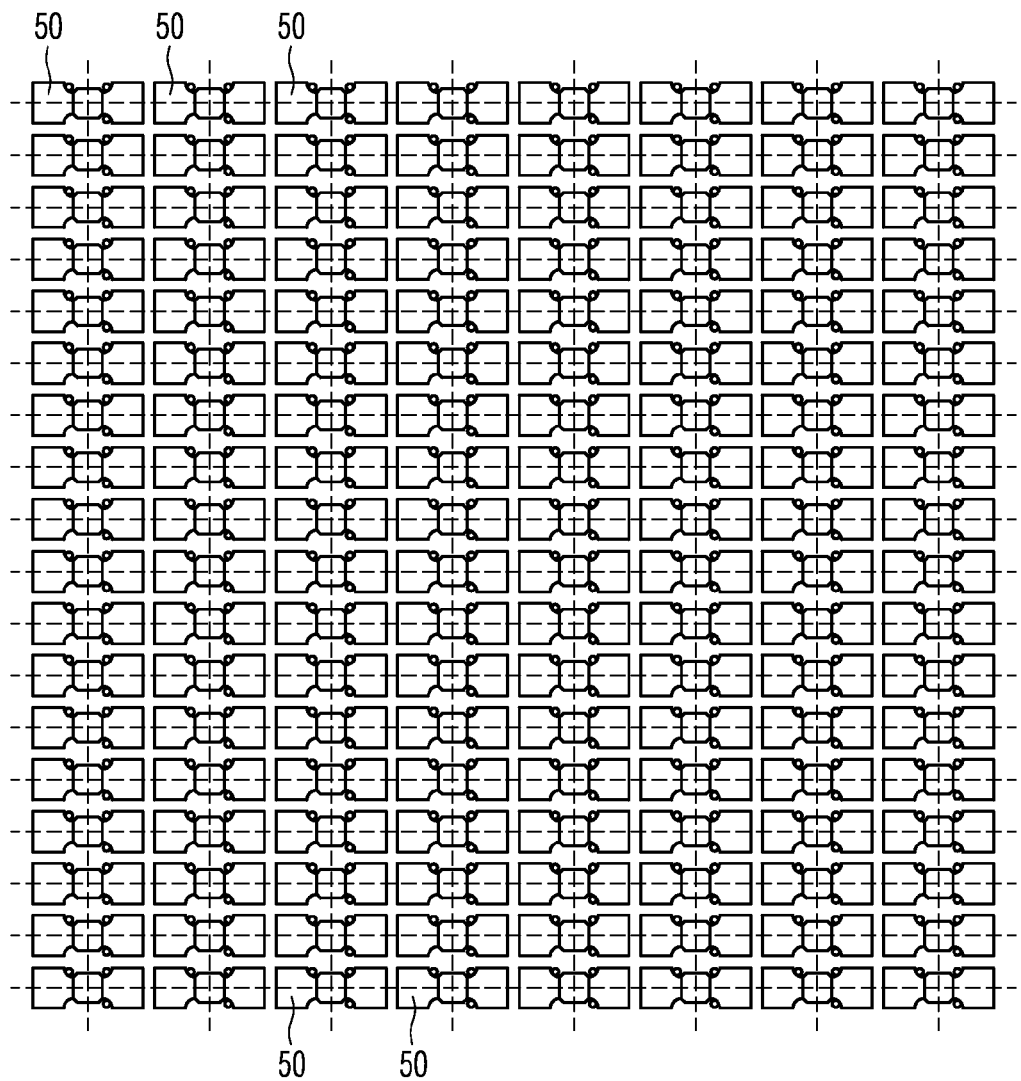
FIG. 5 is a layout of several straps.

FIG. 5 shows a layout of several straps 50, each comprising a substrate 2 including a metallization structure 7. Each strap 50 is supposed to be connected with an integrated circuit 1 as described above. This can be done by simultaneously applying a plurality of thermodes 21 each including a base plate 22. Each thermode 21 is controlled by its individual control device 27.

Finally, it should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprise" and its conjugations do not exclude the presence of elements or steps other than those listed in any claim or the specification as a whole. The singular reference of an element does not exclude the plural reference of such elements and vice-versa. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of determining the distance between an integrated circuit and a substrate, comprising the steps of:
   emitting light that enters an at least semi transparent substrate, passes through the substrate and an at least semi transparent material, particularly an at least semi transparent adhesive, provided between the substrate and an integrated circuit, is reflected by the integrated circuit, passes again through the material and the substrate, and leaves the substrate;
   determining the distance between the substrate and the integrated circuit by evaluating the intensities of the light leaving and entering the substrate, by evaluating the ratio between the intensities of the light leaving and entering the substrate; and
   controlling a process of connecting the integrated circuit to the substrate in response to the determined distance, such that the distance between the integrated circuit and the substrate has a pre-determined distance at the end of the process.

2. A method of controlling attaching an integrated circuit to a substrate, comprising the steps of:
   placing an integrated circuit on a surface of an at least semi transparent substrate, wherein an at least semi transparent material, is provided between the integrated circuit and the surface of the substrate;
   emitting light that enters the substrate, passes through the substrate and the material, is reflected by the integrated circuit, passes again through the material and the substrate, and leaves the substrate;
   evaluating the intensity of the light leaving the substrate; and
   controlling, in response to the evaluated intensity of the light leaving the substrate, the process of attaching the integrated circuit to the substrate.

3. The method of claim 2, further comprising the steps of evaluating the intensities of the light leaving and entering the substrate, particularly the ratio of the intensities of the light leaving and entering the substrate; and
   controlling, in response to the evaluated ratio of the intensities, the process of attaching the integrated circuit to the substrate.

4. The method of claim 3, comprising the step of increasing a force on the integrated circuit until the ratio of the intensities of the light leaving and entering the substrate reaches a pre-defined value.

5. The method of claim 2, wherein the transparency of the material is chosen such that the ratio of the intensities of the light leaving and entering the substrate is between 0.3 and 0.7.

6. A device for determining the distance between an integrated circuit and a substrate, comprising
   a light source configured to emit light such that the light of the light source enters an at least semi transparent substrate, passes through the substrate and an at least semi transparent material, that is located between the substrate and an integrated circuit, is reflected by the integrated circuit, passes again through the material and the substrate, and leaves the substrate;
   a measuring device configured to measure the intensity of the light leaving the substrate; wherein the device is configured to determine the distance between the substrate and the integrated circuit by evaluating the measured intensity of the light leaving and the intensity of the light entering the substrate; and
   a control device configured to control a process of connecting the integrated circuit to the substrate in response to the determined distance, such that the distance between the integrated circuit and the substrate has a pre-determined distance at the end of the process.

7. The device of claim 6, further comprising
   a first light guide configured to guide the light of the light source to the substrate; and
   a second light guide configured to guide the light leaving the substrate to the measuring device.

8. A device for controlling attaching an integrated circuit to a substrate, comprising
   a light source configured to emit light such that the light of the light source enters an at least semi transparent substrate, passes through the substrate and an at least semi transparent material that is located between the substrate and an integrated circuit, is reflected by the integrated circuit, passes again through the material and the substrate, and leaves the substrate;

a measuring device configured to measure the intensity of the light leaving the substrate; and a control device configured to control, in response to the measured intensity of the light leaving the substrate, a process of attaching the integrated circuit to the substrate by controlling a force the integrated circuit is pressed on the surface of the substrate, and a temperature is applied to the material during the process of attaching the integrated circuit to the substrate.

9. The device of claim 8, wherein the control device is configured to control the process of attaching the integrated circuit to the substrate in response to the measured intensity of the light leaving the substrate and the intensity of the light entering the substrate.

10. The device of claim 9, wherein the control device is configured to increase the force until the ratio reaches a predefined value.

11. The device of claim 10, wherein the transparency of the material is chosen such that the ratio when reaching the predefined value is between 0.3 and 0.7.

* * * * *